(12) United States Patent
Jiang et al.

(10) Patent No.: US 10,901,565 B2
(45) Date of Patent: Jan. 26, 2021

(54) PORTABLE COMPUTER

(71) Applicants: Tsinghua University, Beijing (CN); HON HAI PRECISION INDUSTRY CO., LTD., New Taipei (TW)

(72) Inventors: Kai-Li Jiang, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/837,415

(22) Filed: Aug. 27, 2015

(65) Prior Publication Data
US 2015/0370389 A1 Dec. 24, 2015

Related U.S. Application Data

(62) Division of application No. 12/459,544, filed on Jul. 2, 2009, now abandoned.

(30) Foreign Application Priority Data

Jul. 4, 2008 (CN) .......................... 2008 1 0068332

(51) Int. Cl.
*G06F 3/045* (2006.01)
*G06F 3/044* (2006.01)
*G06F 1/16* (2006.01)
*G06F 3/047* (2006.01)
*G09G 5/00* (2006.01)

(52) U.S. Cl.
CPC .......... *G06F 3/0445* (2019.05); *G06F 1/1626* (2013.01); *G06F 1/1643* (2013.01); *G06F 3/045* (2013.01); *G06F 3/047* (2013.01); *G06F 3/0447* (2019.05); *G09G 5/003* (2013.01); *G09G 2300/0426* (2013.01)

(58) Field of Classification Search
CPC ......... G06F 2203/04107; G06F 3/0445; G06F 3/0447; G06F 3/045; G06F 1/1643; G06F 1/1626; G06F 3/047; G09G 5/003; G09G 2300/0426
See application file for complete search history.

(56) References Cited

U.S. PATENT DOCUMENTS

| | | | |
|---|---|---|---|
| 2004/0053780 A1* | 3/2004 | Jiang ........................ | B01J 23/74 502/182 |
| 2006/0109252 A1* | 5/2006 | Kolmykov-Zotov ........................ | G06F 3/03545 345/173 |
| 2006/0187213 A1* | 8/2006 | Su ........................... | G06F 3/045 345/173 |
| 2006/0274048 A1* | 12/2006 | Spath ...................... | G06F 3/045 345/173 |
| 2009/0046078 A1* | 2/2009 | Kent ....................... | G06F 3/044 345/176 |

(Continued)

FOREIGN PATENT DOCUMENTS

WO WO 2007015710 A2 * 2/2007 ............. B82Y 10/00

*Primary Examiner* — Jeff Piziali
(74) *Attorney, Agent, or Firm* — ScienBiziP, P.C.

(57) ABSTRACT

A portable computer includes a display panel having a display surface and a touch panel. The touch panel is disposed on the display surface and comprises at least one transparent conductive layer. The transparent conductive layer includes a carbon nanotubes layer having a carbon nanotube film.

15 Claims, 6 Drawing Sheets

(56) References Cited

U.S. PATENT DOCUMENTS

| | | | |
|---|---|---|---|
| 2009/0293631 A1* | 12/2009 | Radivojevic | G01L 1/16 73/774 |
| 2009/0321113 A1* | 12/2009 | Allemand | B22F 1/0022 174/257 |
| 2009/0326833 A1* | 12/2009 | Ryhanen | G06N 3/0675 702/33 |
| 2010/0001975 A1* | 1/2010 | Jiang | G06F 1/1626 345/174 |
| 2010/0048254 A1* | 2/2010 | Jiang | H04M 1/0266 455/566 |
| 2010/0220074 A1* | 9/2010 | Irvin, Jr. | G06F 3/045 345/174 |
| 2011/0115727 A1* | 5/2011 | Feng | G06F 3/0412 345/173 |

* cited by examiner

PORTABLE COMPUTER

RELATED APPLICATIONS

This application is a continuation of U.S. patent application Ser. No. 12/459,544, filed on Jul. 2, 2009, "PORTABLE COMPUTER". The disclosures of the above-identified applications are incorporated herein by reference.

BACKGROUND

1. Technical Field

The present disclosure relates to portable computers, and, in particular, to a portable computer having a carbon nanotube based touch panel.

2. Description of the Related Art

Conventional portable computers include display panels and bodies connected to the display panels. Touch panels are mounted on surfaces of the display panels. The touch panels can function as inputting devices, effectively replacing a mouse or keyboard, to control and input information. A user of any such electronic apparatus operates the touch panel by pressing or touching the touch panel with a finger, a pen, a stylus, or any tool while visually observing the display panel.

At present, different types of touch panels have been developed, including a resistance-type, a capacitance-type, an infrared-type, and a surface sound wave-type. The resistance-type and capacitance-type touch panels have been widely used in the portable computers because of higher accuracy and resolution.

Conventional capacitance-type or resistive-type touch panels employ conductive indium tin oxide (ITO) as transparent conductive layers. However, the ITO layer of the conventional touch panel have poor mechanical durability, low chemical endurance, and uneven resistance over an entire area of the touch panel. Furthermore, the ITO layer has relatively low transparency in humid environments. All the above-mentioned problems of the ITO layer tend to yield a touch panel with relatively low sensitivity, accuracy, and brightness. Moreover, the ITO layer is generally formed by means of ion-beam sputtering, a relatively complicated method.

What is needed, therefore, is a portable computer having a carbon nanotube based touch panel that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
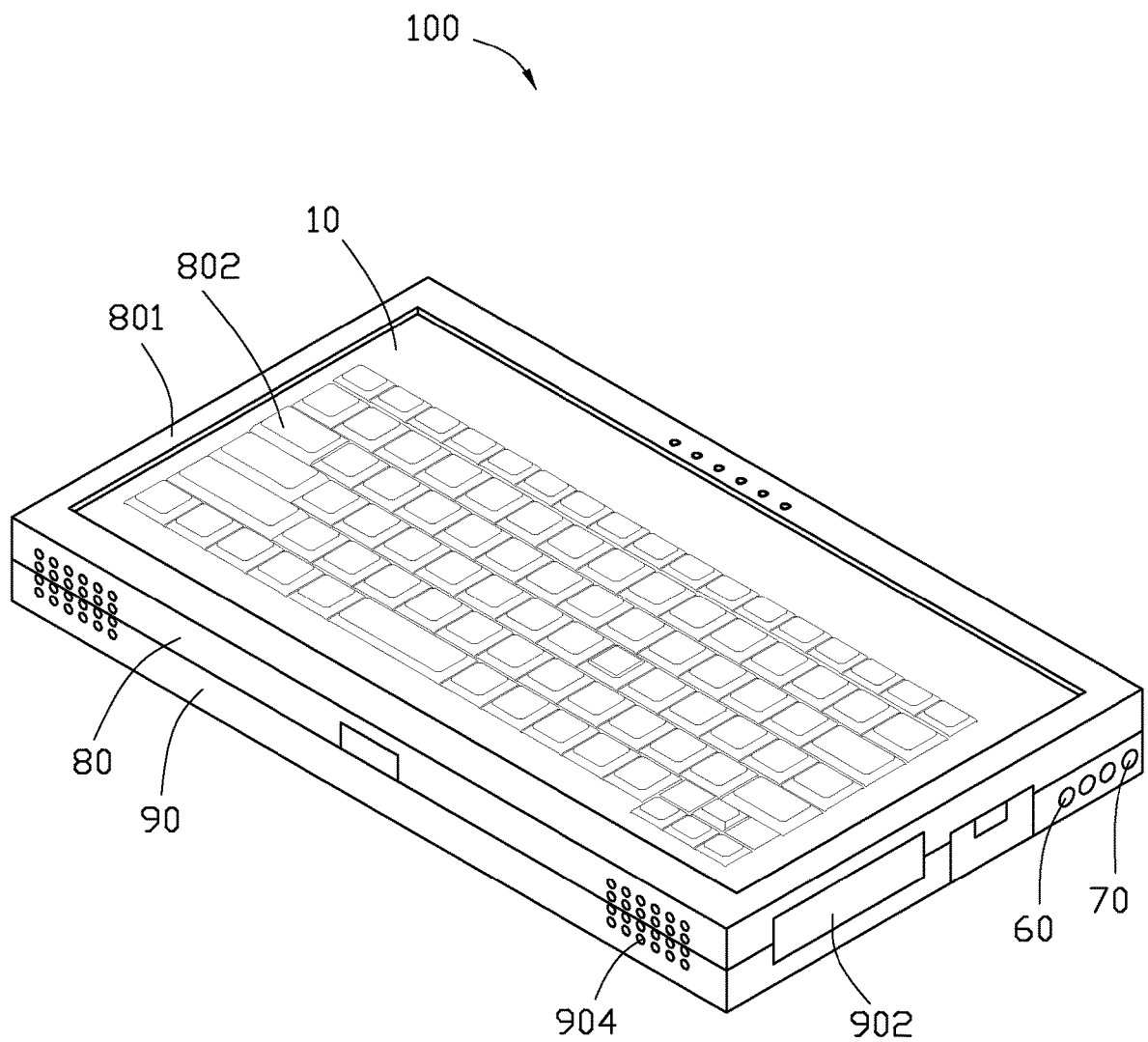
FIG. 1 is an isometric view of one embodiment of a portable computer having one embodiment of a resistive-type touch panel.

Referring to FIG. 1, one embodiment of a portable computer 100 includes a display panel 80, a body 90, and one embodiment of a touch panel 10. The display panel 80 has a display surface 801. The body 90 is disposed on another surface of the display panel 80 opposite to the display surface 801. The touch panel 10 is mounted on the display surface 801 of the display panel 80. The display panel 80 may be one of a liquid crystal display panel, a field emission display panel, a plasma display panel, an electroluminescent display panel, a vacuum fluorescent display panel, or the like. The display panel 80 is used to display data, images, and other objects from the body 90. In the present embodiment, the display panel 80 is a liquid crystal display panel. Electrical connections between the display panel 80, the body 90 and the touch panel 10 are achieved via internal input and output ports because the display panel 80, the body 90, and the touch panel 10 are integrated together.

The portable computer 100 includes an external input port 60 and at least one external output port 70 disposed on a side wall of the body 90. The input port 60 may be used to connect a mouse and/or a keyboard to the body 90. The output port 70 may be used to connect to another device.

The body 90 includes a mother board, a central processing unit (CPU), a memory, and a hard disk. The mother board includes a system bus, a data bus, a control bus, sockets, and connectors disposed thereon. The CPU, the memory, a display card, an audio card, a net card, or a video card may be directly installed on the mother board. The hard disk and a power source mounted in the body 90 are electrically connected to the mother board via cables. One end of the display card electrically connects to an inner input port (not shown) to transport signals to the display panel 80 from the body 90. The portable computer 100 may further include buttons, lamps, or switches installed to the mother board, and two speakers 904 and a hard disk drive 902 disposed on side walls thereof.

The touch panel 10 has a function of inputting signals. The signals can be command signals, text signals, and so on. The touch panel 10 can replace conventional input means, such as a mouse and a keyboard. A user of any such electronic apparatus operates the touch panel 10 by pressing or touching the touch panel 10 with a finger, a pen, a stylus, or another like tool to input signals to the body 90. The touch panel 10 can be spaced from the display surface 801 or installed directly on the display panel 80. When the display panel 80 is installed directly on the touch panel 10, the touch panel 10 can be adhered on the display surface 801 via paste, such as silver paste. In the present embodiment, the touch panel 10 is installed directly on the display panel 80. The touch panel 10 may have substantially the same surface area as the display surface 801 of the display panel 80. Understandably, when the touch panel 10 has an area sufficiently less than that of the display surface 801, more than one touch panel 10 may be mounted on the display surface 801 for inputting different instructions at the same time via different touch panels 10. The touch panel 10 and the display panel 80 may be integrated, such as using a same base. Furthermore, a screen keyboard 802 can be disposed on the display surface 801 of the display panel 80 for directly inputting information via the touch panel 10.

Figure 2:
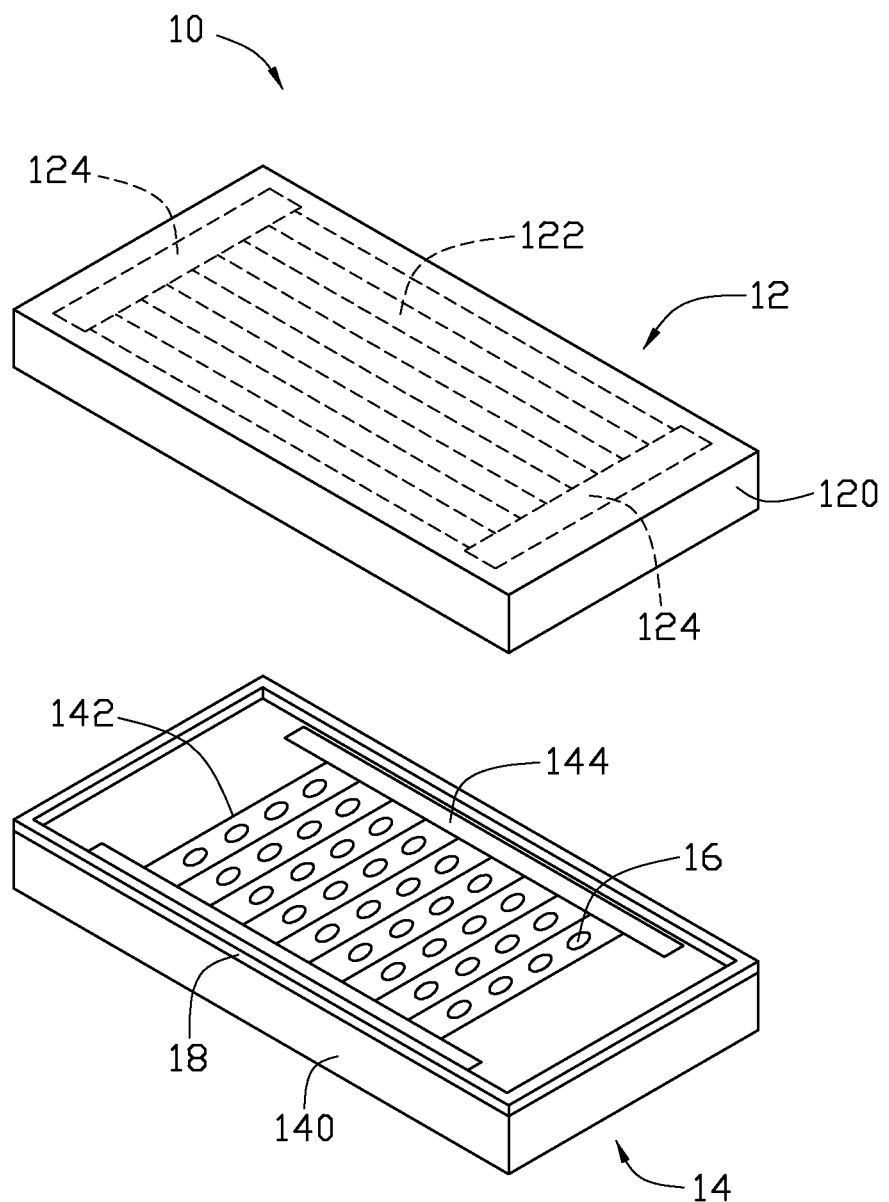
FIG. 2 is an isometric, partial exploded view of the resistive-type touch panel of FIG. 1.
Figure 3:
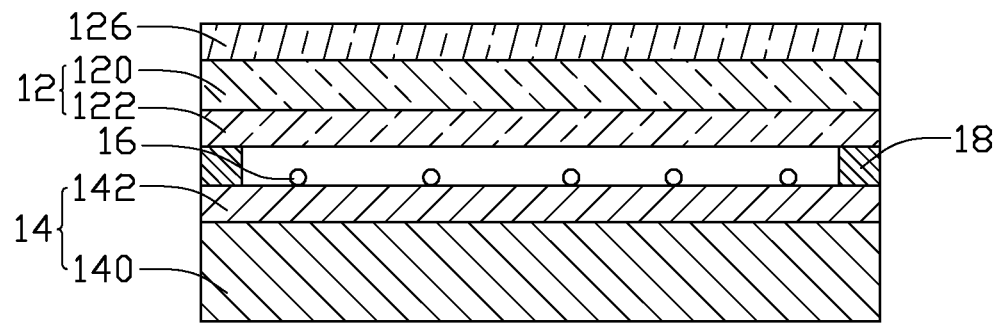
FIG. 3 is a schematic, cross-sectional view of the resistive-type touch panel of FIG. 1.

Referring to FIG. 2 and FIG. 3, one embodiment of the touch panel 10 is a resistive-type touch panel, and includes a first electrode plate 12, a second electrode plate 14, and a plurality of transparent dot spacers 16 interposed between the first and second electrode plates 12, 14.

The first electrode plate 12 includes a first substrate 120, a first transparent conductive layer 122, and two first electrodes 124. The first substrate 120 has a planar structure, and includes a first surface. The first transparent conductive layer 122 and the two first electrodes 124 are mounted on the first surface of the first substrate 120. The two first electrodes 124 are respectively disposed on the two ends of the first substrate 120 along a first direction and electrically connected to the first transparent conductive layer 122. The second electrode plate 14 includes a second substrate 140, a second transparent conductive layer 142 and two second electrodes 144. The second substrate 140 has a planar structure, and includes a second surface facing the first surface. The second transparent conductive layer 142 and the two second electrodes 144 are disposed on the second surface of the second substrate 140. The two second electrodes 144 are respectively disposed on the two ends of the second surface of the second substrate 140 along a second direction and electrically connected to the second transparent conductive layer 142. The first direction is substantially perpendicular to the second direction, namely, the two first electrodes 124 are orthogonal to the two second electrodes 144. The second substrate 140 of the touch panel 10 is mounted on the display surface 801 of the display panel 80.

The first substrate 120 can be a transparent and flexible film or plate made of polymer, resin, or any other suitable flexible material. The second substrate 140 can be a rigid and transparent board made of glass, diamond, quartz, plastic or any other suitable material, or can be a transparent flexible film or plate similar to the first substrate 120 when the touch panel 10 is flexible. The first electrodes 124 and the second electrodes 144 are made of metal, metallic carbon nanotube film or any other conductive material, so long as it is electrically conductive. In the present embodiment, the first substrate 120 is made of resin material, the second substrate 140 is made of glass, and the first and second electrodes 124, 144 are carbon nanotube films having a width of about 1 μm to about 1 mm.

Furthermore, an insulating pad 18 is disposed on the periphery of the second surface of the second electrode plate 14. The first electrode plate 12 is disposed on the insulating pad 18. The first transparent conductive layer 122 of the first electrode plate 12 faces the second transparent conductive layer 142 of the second electrode plate 14. The plurality of transparent dot spacers 16 are spaced apart from one another and disposed on the second transparent conductive layer 142 of the second electrode plate 14. A distance between the first and second electrode plates 12, 14 is in a range of about 2 μm to about 100 μm. The insulating pad 18 and the transparent dot spacers 16 are made of transparent resin or the like and are used for insulating the first electrode plate 12 with the second electrode plate 14. Understandably, if the resistive-type touch panel 10 is small enough, the dot spacers 16 may be omitted.

A transparent protective film 126 may be disposed on the top surface of the first electrode plate 12 opposite to the first surface of the first electrode plate 12. The transparent protective film 126 may be directly adhered on the first electrode plate 12 via paste, or combined with the first electrode plate 12 via a heat-press method. The transparent protective film 126 may be a plastic layer or a resin layer, which are dealt with via surface rigid treating. The resin layer may be made of benzo-cyclo-butene, polymethyl methacrylate, polymer resin, polyethylene terephthalate, or the like. In the present embodiment, the transparent protective film 126 is made of polyethylene terephthalate, and configured for protecting the first electrode plate 12 by improving wearability thereof. The transparent protective film 126 may provide some additional function, such as decreasing glare and reflection.

At least one of the first and second transparent conductive layers 122, 142 includes a carbon nanotube structure. The carbon nanotube structure includes one or more carbon nanotube films. The carbon nanotube film is formed by a plurality of carbon nanotubes, ordered or otherwise, and has a uniform thickness. The carbon nanotube film can be an ordered film or a disordered film. The ordered carbon nanotube film consists of ordered carbon nanotubes. Ordered carbon nanotube films include films where the carbon nanotubes are arranged along a primary direction. Examples include films where the carbon nanotubes are arranged approximately along a same direction or have two or more sections within each of which the carbon nanotubes are arranged approximately along a same direction (different sections can have different directions). In the ordered carbon nanotube film, the carbon nanotubes can be primarily oriented along a same direction. However, the ordered carbon nanotube film can also have sections of carbon nanotubes aligned in a common direction. The ordered carbon nanotube film can have two or more sections, and the sections can have different alignments. The ordered carbon nanotube film may have a free-standing structure. The free-standing carbon nanotube film may include two types. One type is that the carbon nanotube film needs no substrate to support the carbon nanotubes thereof. Another type is that the carbon nanotube film only needs one or more supporting dots (not shown) to support one or more points thereof. Thus, left parts of the carbon nanotube film are hung. In the ordered carbon nanotube films, the carbon nanotubes are oriented along a same preferred orientation and approximately parallel to each other. The term "approximately" as used herein means that it is impossible and unnecessary that each of the carbon nanotubes in the carbon nanotube films are exactly parallel to one another, namely that every carbon nanotube is parallel to each other, because in the course of fabricating the carbon nanotube film, some factor, such as the change of drawing speed, affects the non-uniform drawing force on the carbon nanotube film as the carbon nanotube film is drawn from a carbon nanotube array. A film can be drawn from a carbon nanotube array, to form the ordered carbon nanotube film, namely a drawn carbon nanotube film. Examples of drawn carbon nanotube film are taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The drawn carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nanometers to about 100 micrometers.

The ordered film also can be a pressed carbon nanotube film. The carbon nanotubes in the pressed carbon nanotube film can overlap each other. The adjacent carbon nanotubes are combined and attracted by van der Waals attractive force, thereby forming a free-standing structure. The pressed carbon nanotube film has two or more sections, each of which has the carbon nanotubes arranged approximately along a same direction (different sections can have different directions). The pressed carbon nanotube film can be formed by pressing a carbon nanotube array on a substrate. An angle between a primary alignment direction of the carbon nanotubes and the substrate is in a range from about 0 degrees to about 15 degrees. The angle is closely related to pressure applied to the carbon nanotube array. The greater the pressure, the smaller the angle. In one embodiment, the carbon nanotubes in the pressed carbon nanotube film can be approximately parallel to the surface of the pressed carbon nanotube film when the angle is about 0 degrees.

The disordered carbon nanotube film consists of disordered carbon nanotubes. Disordered carbon nanotube films include randomly aligned carbon nanotubes. When the disordered carbon nanotube film has a number of the carbon nanotubes aligned in every direction that are substantially equal, the disordered carbon nanotube film can be isotropic. The disordered carbon nanotubes can be entangled with each other and/or are approximately parallel to a surface of the disordered carbon nanotube film. The disordered carbon nanotube film may be a flocculated carbon nanotube film. The flocculated carbon nanotube film can include a plurality of long, curved, disordered carbon nanotubes entangled with each other. Furthermore, the carbon nanotubes in the flocculated carbon nanotube film can be isotropic. The carbon nanotubes can be substantially uniformly dispersed in the carbon nanotube film. Adjacent carbon nanotubes are attracted by van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase a specific surface area of the carbon nanotube structure. Furthermore, due to the carbon nanotubes in the flocculated carbon nanotube film being entangled with each other, the touch panel 10 employing the flocculated carbon nanotube film has excellent durability, and can be fashioned into desired shapes with a low risk to the integrity of the flocculated carbon nanotube film. The thickness of the flocculated carbon nanotube film can range from about 0.5 nanometers to about 1 millimeter.

A length and a width of the carbon nanotube film can be arbitrarily set as desired. A thickness of the drawn carbon nanotube film is in a range from about 0.5 nanometers to about 100 micrometers. A thickness of the pressed or flocculated carbon nanotube film is in a range from about 0.5 nm to about 1 mm. The carbon nanotubes in the carbon nanotube film can be selected from the group consisting of single-walled, double-walled, multi-walled carbon nanotubes, and combinations thereof. Diameters of the single-walled carbon nanotubes, the double-walled carbon nanotubes, and the multi-walled carbon nanotubes can, respectively, be in the approximate range from about 0.5 nm to about 50 nanometers, about 1 nm to about 50 nanometers, and about 1.5 nm to about 50 nanometers.

In the present embodiment, the first transparent conductive layer 122 and the second transparent conductive layer 142 each include a carbon nanotube structure. In particular, the first and second transparent conductive layers 122, 142 are free standing carbon nanotube films and are made of the carbon nanotube film. The carbon nanotube structure is an ordered drawn carbon nanotube film. The drawn carbon nanotube structure may include a number of carbon nanotube films stacked with each other. The carbon nanotubes of each of the drawn carbon nanotube films are arranged along a preferred orientation. The drawn carbon nanotube film includes a number of carbon nanotube segments joined end by end via van der Waals attractive forces. The carbon nanotube segments have a substantially same length and composed of a number of substantially parallel arranged carbon nanotubes. In the present embodiment, the drawn carbon nanotube films of the first transparent conductive layer 122 are overlapped along the first direction, and the drawn carbon nanotube films of the second transparent conductive layer 142 are overlapped along the second direction. The drawn carbon nanotube films have a thickness of about 0.5 nm to about 100 mm and a width of about 0.01 centimeters to about 10 meters.

Figure 4:
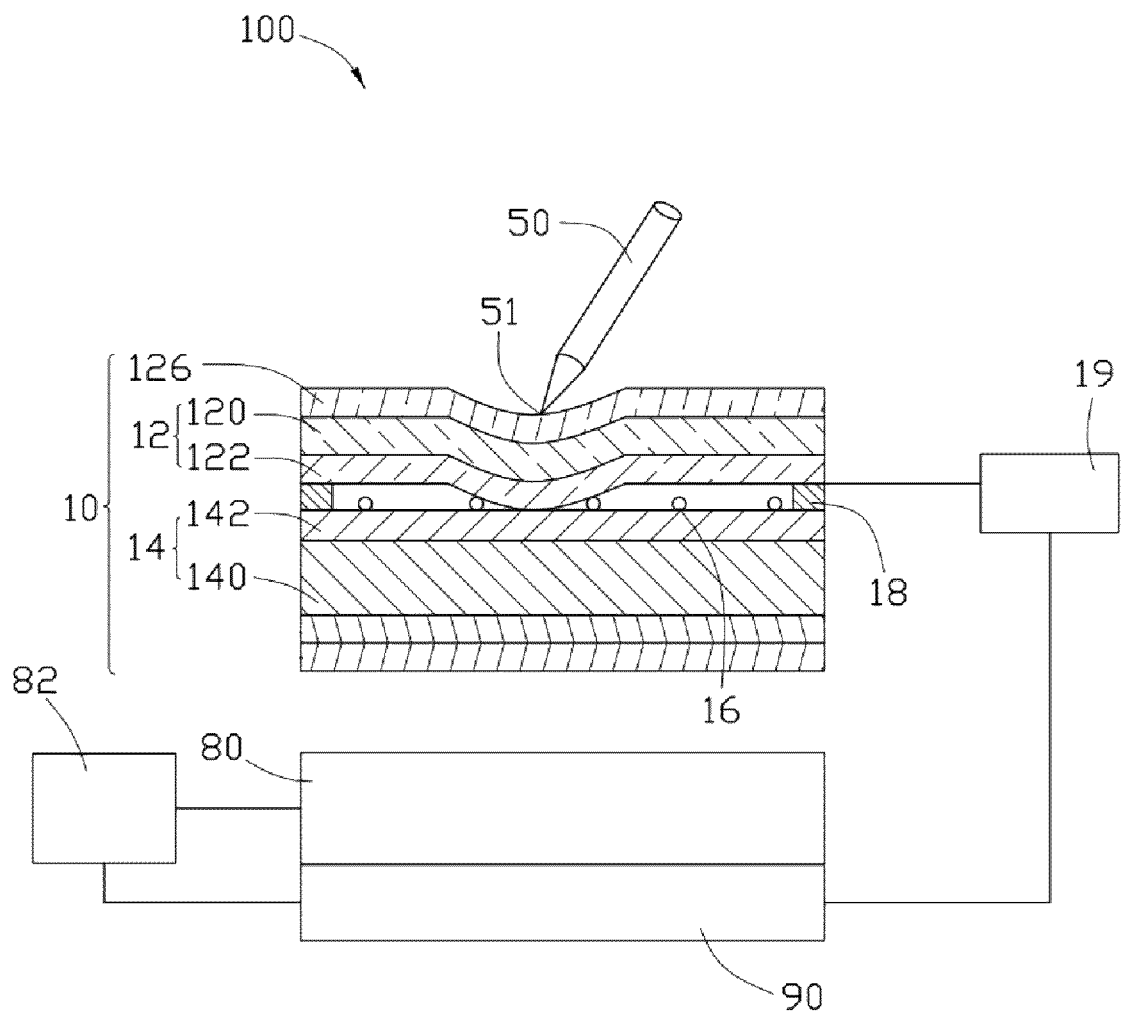
FIG. 4 is a schematic view of the resistive-type touch panel of FIG. 1 when in use.

Referring to FIG. 4, the touch panel 10 further includes a touch controller 19. The touch controller 19 is configured to control and handle data and signals of touch points of the touch panel 10. The display panel 80 further includes a display controller 82. The display controller 82 is configured to control the input and output of data of the display panel 80.

In operation of the portable computer 100, a voltage of about 5 volts is applied to the first and second electrodes 124, 144, forming equipotential lines respectively substantially parallel to the first and second electrodes 124, 144 in the first and second transparent conductive layers 122, 142. A user operates the portable computer 100 by pressing or touching the first electrode plate 12 of the touch panel 10 with a touch tool 50, such as a finger, or an electrical pen/stylus, while visually observing the display panel 80 through the touch panel 10. This pressing causes a deformation of the first electrode plate 12. The deformation of the first electrode plate 12 causes a connection between the first and second transparent conductive layers 122, 142. Changes in voltages in the first direction of the first transparent conductive layer 122 and the second direction of the second transparent conductive layer 142 can be detected by the touch controller 19. Then, the touch controller 19 transforms the changes in voltages into coordinates of a touch point 51, and sends the coordinates of the touch point 51 to the body 90. The body 90 finds an instruction according to the coordinates of the touch point 51 and executes the instruction, such as sending a control signal to the display panel 80, and the display panel 80 operates according to the control signal.

Figure 5:
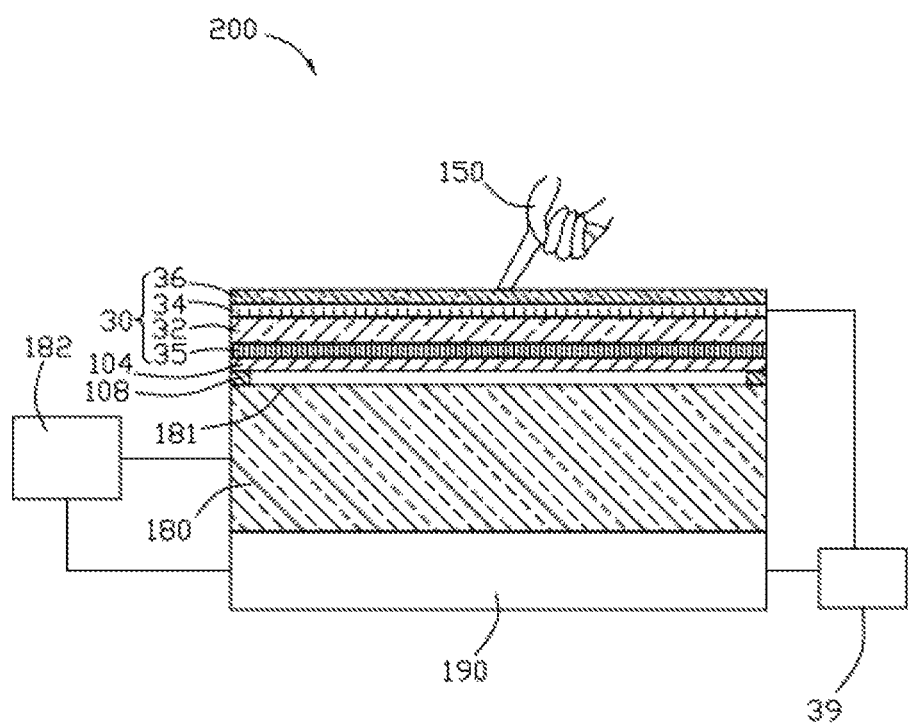
FIG. 5 is a schematic view of another embodiment of a portable computer having one embodiment of a capacitive-type touch panel when in use.
Figure 6:
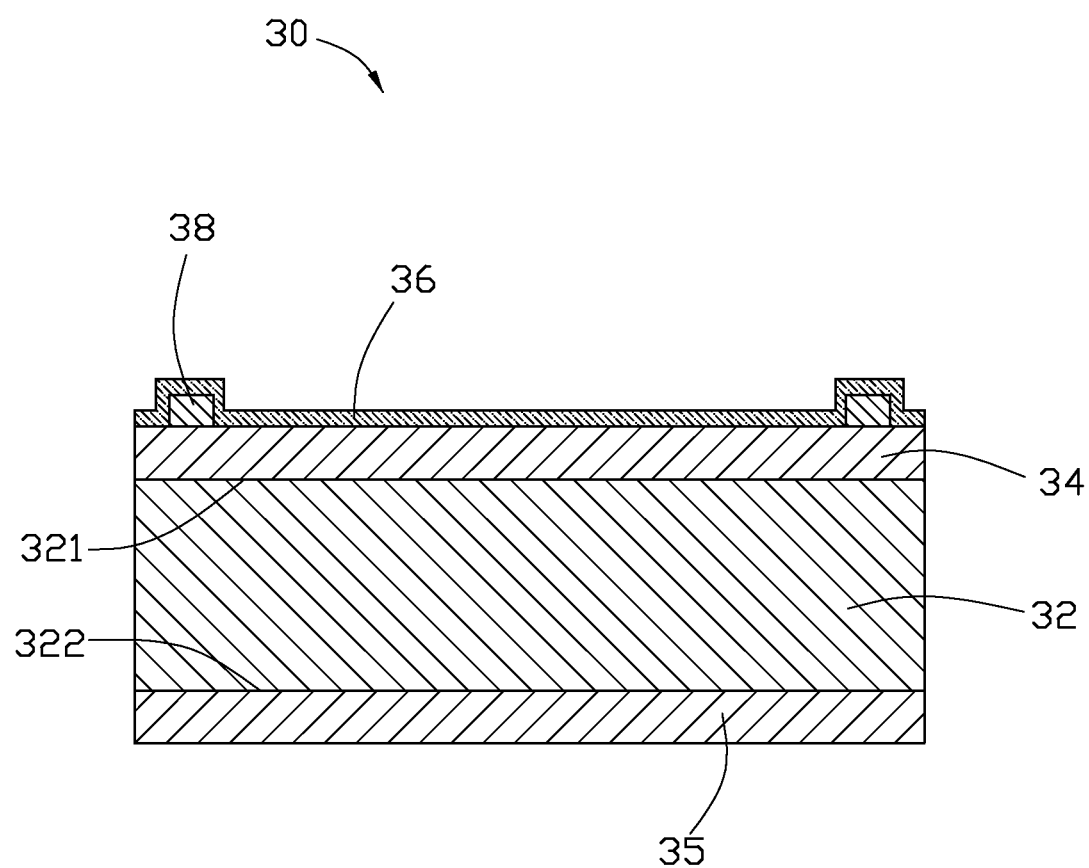
FIG. 6 is a schematic, cross-sectional view of the capacitive-type touch panel of FIG. 5.

Referring to FIG. 5 and FIG. 6, another embodiment of the portable computer 200 includes a display panel 180, a body 190, and a capacitive-type touch panel 30.

When the display panel 180 is spaced apart from the capacitive-type touch panel 30, a passivation layer 104 is disposed on the touch panel 30 and the display panel 180. The passivation layer 104 is used for preventing crosstalk, electrochemical corrosion, and reducing power consumption. The passivation layer 104 is made of silicon nitrogen, silicon oxide, or the like. The portable computer 200 may further includes a supporter 108 for supporting the capacitive-type touch panel 30. The supporter 108 is sandwiched between the capacitive-type touch panel 30 and the display panel 180. Understandably, when the touch panel 30 is directly disposed on the display panel 80, the supporter 108 can be omitted, and the passivation layer 104 can be directly mounted on the display surface 181 of the display panel 80.

The touch panel 30 is a capacitive-type touch panel. The touch panel 30 includes a substrate 32, a transparent conductive layer 34, at least two electrodes 38, and a transparent protective film 36. The substrate 32 includes a first surface 321 and a second surface 322 opposite to the first surface 321. The transparent conductive layer 34 is mounted on the first surface 321 of the substrate 32. The electrodes 38 are disposed at the periphery of the transparent conductive layer 34, spaced from each other, and electrically connected to the transparent conductive layer 34 to form equipotential lines thereon. The transparent protective film 36 can be directly disposed on the transparent conductive layer 34 and the electrodes 38. The electrodes 38 can be transparent electrodes, and the transparent electrodes consist of carbon nanotube film.

The substrate 32 can have a curved structure or a planar structure and functions as a supporter. The substrate 32 may be made of a rigid material or a flexible material, such as glass, silicon, diamond, plastic, or the like.

The transparent conductive layer 34 includes a carbon nanotube layer. The carbon nanotube structure includes a number of uniformly arranged carbon nanotubes, orderly or disorderly. In the present embodiment, the carbon nanotube structure of the transparent conductive layer 34 has a same configuration as the first and second transparent conductive layer 122, 142.

There are no particular restrictions on the shape of the touch panel 30, the transparent conductive layer 34, or the substrate 32. The touch panel 30 may have a linear-shaped, triangular-shaped or rectangular-shaped touch area. In the present embodiment, the touch panel 30 has a rectangular-shaped touch area.

For compatibility with the rectangular-shaped touch area, the transparent conductive layer 34 and the substrate 32 also have a rectangular shape. In order to form a uniform resistive net on the transparent conductive layer 34, the touch panel 30 has four electrodes 38 respectively disposed at the four sides of the transparent conductive layer 34. Understandably, the four electrodes 38 can be disposed on different surfaces of the transparent conductive layer 34 as long as equipotential lines can be formed on the transparent conductive layer 34. The four electrodes 38 are made of conductive metal, carbon nanotube thin film, or the like. In the present embodiment, the four electrodes 38 are layers of silver, copper, or foils of metal, and have strip-shaped structures. The electrodes 38 can be formed on the transparent conductive layer 34 via a deposition method, such as sputter, electroplating, chemical plating, or the like. Furthermore, the four electrodes 38 can be adhered on the transparent conductive layer 34 via paste, such as silver paste.

In order to prolong the life of the transparent conductive layer 34 and limit capacitance between the touch point and the transparent conductive layer 34, a transparent protective film 36 is disposed on the transparent conductive layer 34 and the electrodes 38. The transparent protective film 36 is made of polyethylene terephthalate, silicon nitrogen, silicon oxide or the like, and configured for protecting the transparent conductive layer 34 for improving wearability thereof. The transparent protective film 36 may provide some additional function, such as decreasing glare and reflection after special surface treatment.

In the present embodiment, the transparent protective film 36, which is made of silicon dioxide, is disposed on the transparent conductive layer 34 on which the electrodes 38 are mounted. The transparent protective film 36 has a hardness of about 7H (H established according to Rockwell hardness test). Understandably, the hardness and the thickness of the transparent protective film 36 may be determined in practice as desired. The transparent protective film 36 is directly adhered on the transparent conductive layer 34 via paste.

The portable computer 200 further includes a shielding layer 35 disposed on the second surface 322 of the touch panel 30 when the touch panel 30 is integrated with the display panel 180. The material of the shielding layer 35 can be a conductive resin film, indium tin oxide; antimony doped tin oxide, carbon nanotube film, or another kind of flexible and conductive film. In the present embodiment, the shielding layer 35 is a carbon nanotube film. The carbon nanotube film includes a plurality of carbon nanotubes, and the orientation of the carbon nanotubes therein can be arbitrarily determined. Understandably, the carbon nanotubes in the carbon nanotube film of the shielding layer 35 can be arranged along a same direction. The carbon nanotube film is connected to ground and acts as shielding, thus enabling the touch panel 30 to operate without interference (e.g., electromagnetic interference).

Furthermore, the touch panel 30 includes a touching controller 39. The touching controller 39 is configured to control and calculate the information of the touch panel 30. The display panel 180 further includes a touch panel control element 182. The touch panel control element 182 is configured to control the input and output of data of the display panel 180.

In operation, voltages are applied to the electrodes 38, by the touching controller 39. A user operates the portable computer 200 by pressing or touching the transparent protective film 36 of the touch panel 30 with a touch tool 150, such as a finger, or an electrical pen/stylus, while visually observing the display panel 180 through the touch panel 30. A coupling capacitance forms between the user and the transparent conductive layer 34 due to an electrical field from the user. For high frequency electrical current, the coupling capacitance is a conductor, and thus the touch tool takes away little current from the touch point. Currents flowing through the four electrodes 38 cooperatively replace the current lost at the touch point. The quantity of current supplied by each electrode 38 is directly proportional to the distance from the touch point to the electrodes 38. The touch panel control element 182 is used to calculate the proportion of the four supplied currents, thereby detecting coordinates of the touch point on the touch panel 30. The touch panel control element 182 then sends the coordinates of the touch point to the body 190. The body 190 then sends out commands corresponding to the touch point, such as to the touch panel control element 182, and the touch panel control element 182 further controls the display of the display panel 180.

As described above, the carbon nanotube films employed in the touch panel have superior properties, such as excellent toughness, high mechanical strength, and uniform conductivity. Thus, the touch panel and the mobile phone using the same are durable and highly conductive. Each of the carbon nanotube films includes a number of successively oriented carbon nanotubes joined end to end by the van der Waals attractive force therebetween. As such, the carbon nanotube films are flexible, and suitable for using as the conductive layer in a flexible touch panel. Furthermore, the carbon nanotube films have high transparency, thereby promoting improved brightness of the touch panel and the mobile phone using the same. Additionally, since the carbon nanotubes have excellent electrical conductivity properties, the carbon nanotube films have a uniform resistance distribution. Thus, the touch panel and the mobile phone adopting the carbon nanotube films have improved sensitivity and accuracy.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable computer, comprising:
a display panel having a display surface;
a body connected to the display panel; and
a touch panel disposed on the display surface of the display panel, the touch panel consisting of a substrate, a carbon nanotube layer located on the substrate, at least two transparent electrodes spaced with each other and electrically connected to the carbon nanotube layer, and a transparent protective film covering the carbon nanotube layer and the at least two electrodes; wherein the carbon nanotube layer consists of a plurality of carbon nanotubes, a width of the carbon nanotube layer is about 0.01 centimeters to about 10 meters, each of the plurality of carbon nanotubes has an end, and the plurality of carbon nanotubes are joined end to end by van der Waals forces and extend along approximately a same direction; and the carbon nanotube layer has a triangular shape.

2. The portable computer of claim 1, further comprises a passivation layer interposed between the display panel and the touch panel.

3. The portable computer of claim 1, wherein the at least two transparent electrodes are separately fixed on periphery of the carbon nanotube layer via a silver paste.

4. The portable computer of claim 3, wherein the at least two transparent electrodes consist of a carbon nanotube film.

5. The portable computer of claim 1, wherein the substrate comprises a first surface and a second surface opposite to the first surface, the carbon nanotube layer is mounted on the first surface, and the second surface is opposite to the display panel.

6. The portable computer of claim 5, further comprises a shielding layer disposed on the second surface.

7. The portable computer of claim 6, wherein the shielding layer is a carbon nanotube film comprising a plurality of carbon nanotubes.

8. A portable computer, comprising:
a display panel having a display surface;
a body connected to the display panel;
a touch panel disposed on the display surface of the display panel, the touch panel consisting of:
 a substrate;
 a carbon nanotube layer on the substrate, wherein the carbon nanotube layer consists of a plurality of first carbon nanotubes, each of the plurality of first carbon nanotubes has an end, the plurality of first carbon nanotubes are joined end to end by van der Waals forces and extend along approximately a same direction, and the carbon nanotube layer comprises a first surface and a second surface opposite to the first surface; and the carbon nanotube layer has a triangular shape;
 at least two transparent electrodes spaced with each other and electrically connected to the carbon nanotube layer; and
 a transparent protective film covering the carbon nanotube layer and the at least two electrodes, wherein the transparent protective film is on the first surface; and
a shielding layer on the second surface.

9. The portable computer of claim 8, wherein the transparent protective film is directly adhered on the carbon nanotube layer by a paste.

10. The portable computer of claim 8, wherein a material of the shielding layer is indium tin oxide, antimony doped tin oxide, or carbon nanotube.

11. The portable computer of claim 8, wherein the shielding layer is a carbon nanotube film comprising a plurality of second carbon nanotubes arranging along approximately a same direction.

12. The portable computer of claim 8, wherein each of the at least two transparent electrodes comprises a metallic carbon nanotube film.

13. The portable computer of claim 8, further comprising a screen keyboard disposed on the display surface of the display panel for directly inputting information via the touch panel.

14. The portable computer of claim 1, wherein each of the at least two transparent electrodes comprises a metallic carbon nanotube film.

15. The portable computer of claim 1, further comprising a screen keyboard disposed on the display surface of the display panel for directly inputting information via the touch panel.

* * * * *